F. J. TROLL.
LOAD INDICATOR FOR VEHICLES.
APPLICATION FILED MAR. 8, 1916.
1,227,505.
Patented May 22, 1917.
2 SHEETS—SHEET 1.
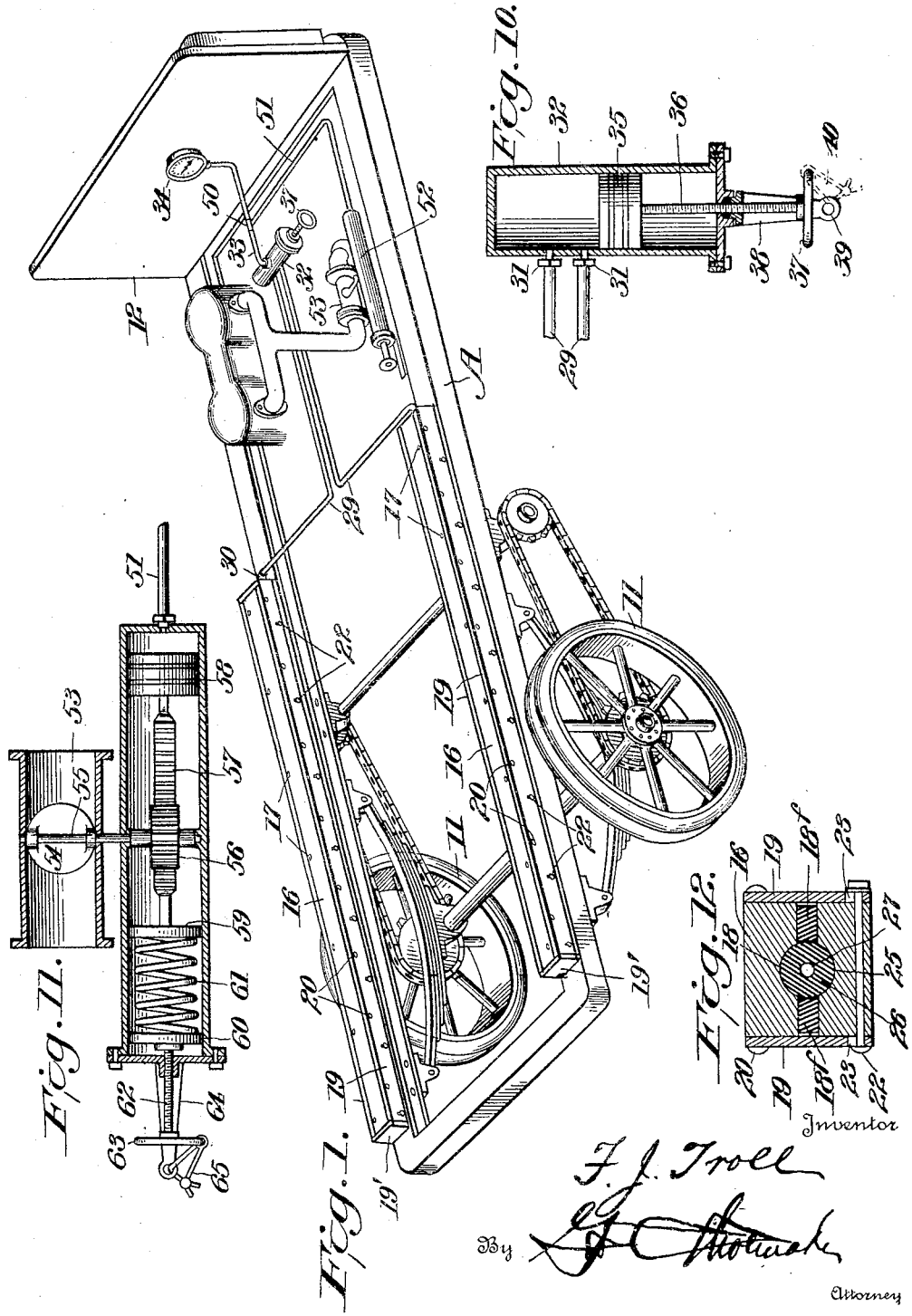

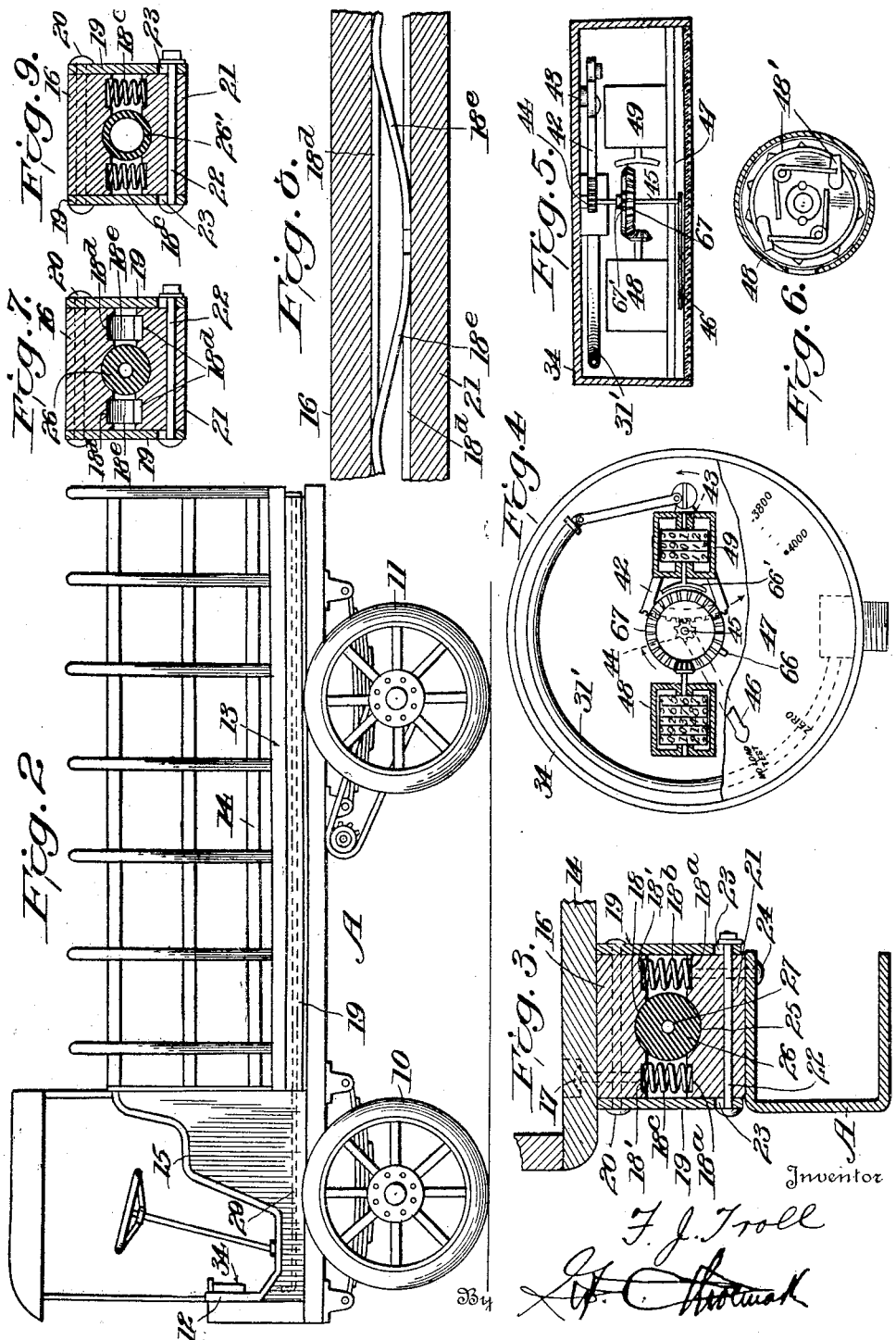

UNITED STATES PATENT OFFICE.

FREDERICK J. TROLL, OF BALTIMORE, MARYLAND, ASSIGNOR TO THE LOADOMETER COMPANY, OF BALTIMORE, MARYLAND.

LOAD-INDICATOR FOR VEHICLES.

1,227,505.   Specification of Letters Patent.   Patented May 22, 1917.

Application filed March 8, 1916. Serial No. 82,979.

*To all whom it may concern:*

Be it known that I, FREDERICK J. TROLL, a citizen of the United States, residing at the city of Baltimore, State of Maryland, have invented certain new and useful Improvements in Load-Indicators for Vehicles, of which the following is a specification.

This invention relates to a load indicator and controller for motor trucks or the like, and may be termed a loadometer.

Motor trucks are sometimes equipped with a sign disposed at some convenient point on the vehicle to indicate the pound capacity thereof. Warnings are also sometimes located on the vehicle to the effect that the vehicle should not be loaded to an extent beyond its rated carrying capacity, say for instance, 3000 pounds. The reason for such notices and warnings is that overloads place the truck under unnecessary strain and impair the life of the truck. A cautious driver, in some instances, in his efforts to exercise extreme care, may underload the truck, thereby reducing the operative efficiency by increasing the unit cost per pound of the materials handled. Careless drivers are likely to overload the truck, thereby increasing the repair cost, tire expense, etc., with the result that, from the manufacturer's viewpoint, the reputation of the truck is affected to the disadvantage of the manufacturer by reason of complaints from owners or purchasers of motor trucks.

It is therefore one object of my invention to provide a means particularly adapted for application to motor trucks or other vehicles to indicate underloads and overloads in units of 200 pounds more or less, so that the rated capacity of the truck will not be abused or the operating efficiency reduced because of failure to load the truck to its rated capacity.

Another object resides in the provision of a fluid pressure means which may be readily applied to a motor truck and which will effectively operate so that the full load may always be carried and an underload or overload always known to the driver or other attendant.

Another object resides in the provision of an appliance readily applicable to a motor vehicle or other truck which embodies among other characteristics means whereby the total pounds handled may be indicated and, when the weight capacity of the vehicle has been reached, indication thereof may be made as may also an indication given of the number of times the vehicle has been overloaded.

A still further object is to provide a motor truck or other vehicle with means for indicating the loads placed upon and carried by the same in conjunction with means associated therewith to prevent running of the vehicle when a predetermined point beyond the rated load capacity has been reached to avoid damage to the vehicle.

It is still further designed to provide resilient or other shock absorbing elements between the chassis frame and body of the truck to reduce the amount of vibration and shocks to the metal parts of the chassis which latter in time is subject to crystallization.

With the above and other objects in view, the present invention consists in the combination and arrangement of parts hereinafter more fully described, illustrated in the accompanying drawings and particularly pointed out in the appended claims, it being understood that changes may be made in the form, size, proportion and minor details without departing from the spirit or sacrificing any of the advantages of the invention.

In the drawings:—

Figure 1 is a perspective view of a portion of a vehicle showing my invention applied thereto.

Fig. 2 is an elevation of a vehicle illustrating the application of my invention thereto.

Fig. 3 is a fragmentary sectional view through one side of the vehicle illustrating a portion of my invention in transverse section.

Fig. 4 is an elevation of the gage with a part of the dial broken away.

Fig. 5 is a horizontal sectional view through the gage.

Fig. 6 is a transverse sectional view through one of the registering mechanisms illustrating one means for preventing backward movement of the registering disks.

Fig. 7 is a transverse sectional view through a pair of coöperating sills illustrating the fluid containing element interposed therebetween and adjacent which on opposite sides thereof are disposed springs of a modified form as compared with the springs illustrated in Fig. 3.

Fig. 8 is a fragmentary longitudinal sectional view of the structure shown in Fig. 7.

Fig. 9 is a sectional view through a pair of sills illustrating a modified form of fluid containing element.

Fig. 10 is a horizontal sectional view through the means for automatically varying or adjusting the capacity of the fluid operating means.

Fig. 11 is a horizontal sectional view through a portion of the manifold intake pipe and the mechanism which is operated to automatically cut off the supply of fluid to the engine.

Fig. 12 is a transverse sectional view through one of the fluid pressure containing elements illustrating coöperating parts.

Referring now more particularly to the accompanying drawings, the reference character A indicates the frame of the chassis of a motor or other truck which is supported on front and rear wheels 10 and 11 in the usual or any suitable manner and to which the dash 12 may be secured.

The character 13 indicates the platform or bottom of the body 14. This truck body usually extends from the rear of the driver's seat 15 to the rear of the frame A.

Secured adjacent opposite edges of the underside of the bottom 13 of the truck are oppositely disposed upper sills 16. Any suitable means may be employed for this purpose, but bolts 17 are effective for the purpose. These sills 16 preferably extend from the rear of the driver's seat to the rear end of the truck. In each sill there is formed a longitudinal groove 18 extending throughout the length of the sill. Adjacent each groove 18 on opposite sides thereof are sockets 18' for a purpose presently explained.

Plates 19 are secured by means of bolts or other suitable elements 20 to the sides of each sill 16 and depend below the respective sills. The plates 19 are thus arranged in pairs, a pair being secured to each sill 16.

Fitted between each pair of plates 19 is a lower sill 21 which is preferably of the same length as the corresponding upper sill 16 and which is supported for vertical movement between the corresponding pair of plates 19 by means of bolts or other suitable elements 22 passing transversely therethrough and having movement at their ends in slots 23 formed at the lower edge of the plates 19. These lower sills 21 are secured by means of bolts or other suitable elements 24 to the chassis A so that the movements of the chassis A incident to uneven riding or jolt of the truck provides for a corresponding up and down movement of the sills 21 and, by virtue of the sill 16 being movable toward and away from the respective sills 21 under the influence of weight put on or taken off of the bottom 13 of the truck 14, there is consequent play between the upper and lower sills on opposite sides of the vehicle.

The upper face of each lower sill 21 is provided with a longitudinal recess 25 extending throughout the length thereof and preferably of the same formation as the longitudinal recess 18 in the respective upper sills 16 and preferably disposed in vertical alinement with the latter. In the recesses or seats thus formed in the upper and lower sills 16 and 21 on each side of the truck I dispose rubber or other compressible, yieldable or resilient elements 26 which extend throughout the length of the respective sills. These resilient elements 26 each has a relatively small bore 27 which renders the same hollow without rendering the material thin between the bore and the outer circumference.

The upper face of each lower sill 21 is also provided with a plurality of sockets 18$^a$ which are arranged on opposite sides of the longitudinal recess 25 of each lower sill. The sockets 18$^a$ of the lower sills are adapted to coincide with the sockets 18' in the upper sills for the purpose of receiving the ends of the inner and outer sets of helical or other springs 18$^b$ and 18$^c$ arranged between each pair of upper and lower sills on opposite sides of the respective compressible, yieldable or resilient elements 26.

The springs 18$^b$ and 18$^c$ relieve the compressible elements 26 of the greater portion of the weight, if not all of the weight, which would naturally fall on them if said springs were not employed. It is possible in the present instance to employ compressible, yieldable or resilient elements 26' in the nature of an ordinary garden hose because the weight may be sustained by said springs 18$^b$ and 18$^c$. If desired, instead of employing the helical springs 18$^b$ and 18$^c$ the upper and lower sills on each side of the vehicle may be provided with longitudinal grooves 18$^d$ designed to receive the leaf springs 18$^e$ which perform the same functions as the aforesaid helical springs. If desired, I may employ solid rubber strips 18$^f$ between the sills on opposite sides of the compressible elements.

Caps, plugs or other suitable elements 19' may be employed to effectually close the outer ends of the compressible elements 26 or 26' in order to prevent escape of fluid which these compressible elements are adapted to contain for the purposes explained presently. The fluid may be air or liquid and, in any event, of such nature as not to have an injurious effect on the compressible elements as would deteriorate or impair the life thereof. The compressible elements and springs are protected from the weather by reason of their location between the sills and between said plates 19 and also by the end plates 19'.

It will thus be understood that there is interposed between the chassis A and the bottom 13 of the truck certain elements which, by virtue of their construction and arrangement, serve for one purpose to absorb shocks between the chassis and the truck body in the event of the vehicle striking obstructions or running over uneven road surfaces, performing this function whether or not the compressible elements contain fluid because of the thickness of the first form of compressible elements described, and because of the co-action therewith of the springs which coöperate therewith. This cushioning or shock absorbing structure interposed as described, however, has for its main object the performance of another function, that is, to operate through other instrumentalities associated therewith to indicate underloading and overloading of the vehicle.

To the latter end recited above, metallic piping or flexible tubes 29 may be connected by means of suitable couplings 30 to the inner ends of the compressible elements 26. These pipe or flexible hose connections 29 are connected by means of suitable couplings 31 with a fluid reservoir 32 located preferably near the front of the chassis. This reservoir 32 has pipe or other connection with a low pressure gage 34 of any suitable character, mounted preferably on the dash 12 of the vehicle in sight of the driver of the truck. The fluid capacity of this reservoir 32 may be adjusted or varied as desired by means of a piston 35 mounted therein and provided with a screw threaded or other stem 36 which extends through one end of the reservoir. This screw threaded stem is provided with a hand wheel or the like 37 which has openings therein. Extending from the reservoir 35 is an arm 38 provided in its outer end with an aperture 39 through which and one of the openings of the hand wheel 37 a seal 40 may be inserted for the purpose of locking the piston 35 in adjusted positions against the manipulation and consequent adjustment by unauthorized persons. Any suitable means for locking the piston 35 against unauthorized adjustment may be employed. Under the action of weight placed on the truck, the compressible elements 26 and 26' and their co-acting springs are depressed according to the weight and this depression of the vehicle body and the consequent compression of the compressible elements 26 and 26' causes the fluid therein and also the fluid in the tubular members 29, the reservoir 32, and the pipe connection 33, to operate the Bourbon tube 31' in the gage 34, which effects actuation of the segmental gear 42 on its pivot 43. This segmental gear 42 is in mesh with the pinion 44 on the indicator hand shaft 45 and when it swings it causes the shaft 45 to rotate and consequently shift the hand 46 over the dial face 47 of the gage 34 and thereby indicate on the dial face the total pounds or amount of load in units as the load is placed on the truck. The dial of the gage gives the rated capacity, say for instance 3000 pounds, although it is preferably graduated to indicate a greater rate of pounds capacity as shown. It also discloses a "zero" point and a "no load test point." The hand indicator 46 should always point to this "no load test point" when the truck is unloaded. There is maintained at all times an initial pressure on the system for should there be any leakage the indicator hand would drop below the "no load test point" toward the "zero" point. Should there be an extra amount of pressure from some cause or other, the hand 46 would go above the "no load test point." The aforesaid adjustable reservoir 32 is provided for the purpose of adjusting the hand indicator 30 to maintain the indicator hand pointing directly under "no load test point" when the truck is unloaded.

It may be mentioned at this point that, if the truck has been loaded with 3000 pounds to be carried to a certain point and then 1000 pounds are removed from the truck, the indicator hand 46 will drop back to the 2000 pound mark. Then, if the truck is sent to another place and it has 600 pounds taken on, the indicator hand 46 will then indicate 2600 pounds. The additional 600 pounds and all loads taken on would be registered on the registering means, including rotatable disks 48 held against back movement, preferably by ratchets 48'. Should the truck be overloaded above a predetermined amount, say for instance, 1000 pounds overload, which would cause the hand indicator 46 to indicate 4000 pounds on the dial, this act of overloading would be registered on a register, including rotatable disks 49, held against backward movement by ratchets 48'.

One way in which the times the truck has been overloaded may be indicated, is to provide the aforesaid beveled gear 67 with a projection or other tripping element 66 which is so disposed that when the gear 67 has been rotated to such an extent as to cause the indicator hand 46 to pass the predetermined amount of overload, as shown on dial 47, the trip 66 will engage the star-wheel 66' and actuate the register mechanism 49, indicating thereon the number of times the truck has been overloaded. If desired, the beveled gear may have a plurality of screw threaded openings 67' on its periphery so that the screw threaded tripping element 66 may be disposed therein interchangeably, whereby the trip will engage the star-wheel 66' at different times, according to the hole in which the trip is placed whereby the amount of overload to be reached and indicated may be adjusted.

By means of the ratchets 48' the registering disks turn in one direction only under the action of registering the loads and cannot accidentally rotate backward.

A T-coupling 50 may be disposed in the line of the tubular connection 33 between the reservoir 32 and the gage 34. A pipe 51 has connection with this T-coupling 50 and with one end of a cylinder 52 which contains means operable under the influence of fluid pressure to operate means in the intake manifold 53 of the engine of the truck to automatically cut off the supply of gas to the cylinders of the engine in the event that the truck is overloaded and thereby prevent operation of the engine and a consequent running of the truck. For instance, to accomplish this in one way there is disposed in the manifold pipe 53 a butterfly valve 54 which has a shaft 55 journaled through the side of said cylinder 52 and to which shaft 55 and located within said cylinder 52 is a pinion 56 which is adapted to mesh with a rack 57 secured at one of its ends to a piston 58 which is slidable in the cylinder 52 under the action of fluid pressure entering the cylinder from said pipe 51. The other end of the rack 57 is secured to a disk 59 interposed between which latter and a disk 60 is a spring 61. The fluid pressure against the piston 59 acts against the tension of this spring 61 to cause the butterfly valve 54 to close the manifold intake pipe 51, thereby shutting off the supply of gas to the engine and preventing movement of the truck under the influence of operation of the motor.

The tension of the spring 61 may be increased or diminished by adjustment of the disk 60 toward and away from the disk 59, there being secured to the disk 60 a screw threaded rod 62 which operates through a screw threaded bore in the adjacent end of the cylinder 52. On the outer end of this screw threaded rod 62 is a hand wheel 63. The object of this arrangement is for the purpose of adjusting the predetermined amount of overload that may be placed on the truck which will operate to cut off the supply of gas to the engine. On the cylinder 52 is an arm 64 provided with an aperture through which and the hand wheel 63 a seal 65 may be passed to prevent unauthorized manipulation or adjustment of the disk 60. Any locking means may be employed for this purpose.

From the foregoing it will be apparent that the capacity of the truck may be varied and that the weight on the truck incident to the materials or commodities placed thereon or removed therefrom will be indicated on the dial 47 of the gage 34. If the truck has a load capacity of, say for instance, 3000 pounds, it will be apparent to the driver or other attendant when the maximum load capacity of the vehicle has been reached, and if the driver or attendant disregards the indication or warning that the maximum load capacity has been reached, the butterfly valve 54 will be operated automatically to cut off the gas supply to the engine so that the driver or other attendant cannot run the vehicle in an overloaded condition. This overloading of the vehicle not only prevents movement of the vehicle but the fact that the vehicle has been overloaded is indicated by the mechanism 49.

What is claimed is:—

1. The combination of a vehicle chassis and a body, pairs of upper and lower sills interposed between the body and the chassis, a fluid pressure containing element interposed between each pair of sills, sets of springs interposed between each pair of sills on opposite sides of the respective fluid containing elements, the latter and the springs being compressible under the influence of weight placed on the body, a gage carried by the vehicle, and connections between said fluid containing elements and the gage whereby the weight placed on the body may be indicated on the gage.

2. The combination of a vehicle chassis and a body, pairs of upper and lower sills interposed between the body and the chassis, a fluid pressure containing element interposed between each pair of sills, yieldable means between each pair of sills on opposite sides of the respective fluid pressure containing elements, the latter and said yieldable means being compressible under the influence of weight placed on the body, a gage carried by the vehicle, and connections between the fluid containing elements and the gage whereby the weight placed on the body may be indicated on the gage.

3. The combination of a vehicle chassis and a body, pairs of upper and lower longitudinally disposed sills interposed between the body and the chassis on opposite sides thereof, a fluid pressure containing element interposed between each pair of sills and which are compressible under the influence of weight placed on the body, springs between each pair of sills, a gage carried by the vehicle, and connections between the fluid containing elements and the gage whereby the weight placed on the body may be indicated on the gage.

4. The combination of a vehicle chassis and a body, pairs of upper and lower longitudinally disposed sills interposed between the body and the chassis on opposite sides thereof, a fluid pressure containing element interposed between each pair of sills and which are compressible under the influence of weight placed on the body, yieldable means separate from the fluid containing elements between the sills, a gage carried by the vehicle, and connections between the fluid containing elements and the gage whereby the weight placed on the body may be indicated on the gage.

5. The combination of a vehicle chassis and a body, pairs of upper and lower longitudinally disposed sills interposed between the body and the chassis on opposite sides thereof, a fluid pressure containing element interposed between each pair of sills and which are compressible under the influence of weight placed on the body, means between the sills to reinforce the fluid containing elements in the support of the body, a gage carried by the vehicle, and connections between the fluid containing elements and the gage whereby the weight placed on the body may be indicated on the gage.

6. The combination of a vehicle chassis and a body, pairs of upper and lower sills interposed between the body and the chassis, a fluid pressure containing element interposed between each pair of sills, means between each pair of sills to reinforce the fluid containing elements in the yieldable support of the body, said reinforcing means and the fluid containing elements being compressible under the influence of weight placed on the body, a gage on the vehicle, and connections between the fluid containing elements and the gage whereby the weight placed on the body may be indicated on the gage.

7. The combination with a vehicle chassis and a body, of compressible elements interposed between the chassis and the body, sets of yieldable elements interposed between the chassis and the body on opposite sides of said compressible elements, a gage, connections between the compressible elements and the gage, a reservoir in the line of said connections, said compressible elements and connections and the reservoir adapted to contain a fluid, and means for varying the fluid capacity of said reservoir.

8. The combination of a vehicle including a body and a chassis, means for yieldably supporting the body so that it may be subject to depression under the influence of weight placed thereon, fluid pressure means interposed between the body and the chassis, sets of yieldable elements interposed between the body and the chassis on opposite sides of the fluid pressure means, an indicator carried by the vehicle, and connections between the fluid pressure means and the gage to indicate when the weight capacity of the vehicle has been reached.

9. The combination of a vehicle including a body and a chassis, means for yieldably supporting the body so that it may be subject to depression under the influence of weight placed thereon, fluid pressure means interposed between the body and the chassis, sets of yieldable elements interposed between the body and the chassis on opposite sides of the fluid pressure means, an indicator carried by the vehicle, connections between the fluid pressure means and the gage to indicate when the weight capacity of the vehicle has been reached, and means for increasing and decreasing the capacity of said fluid pressure means.

10. The combination of a vehicle chassis and a body, of fluid pressure means interposed between the chassis and the body, springs interposed between the chassis and the body on opposite sides of the fluid pressure means, and means having operative connection with said fluid pressure means to indicate when the weight capacity of the vehicle has been reached.

11. The combination of a vehicle chassis and a body, of fluid pressure means interposed between the chassis and the body, springs interposed between the chassis and the body on opposite sides of the fluid pressure means, means having operative connection with said fluid pressure means to indicate when the weight capacity of the vehicle has been reached, and means having operative connection with the indicating means and operable by said fluid pressure means to indicate the number of times the vehicle has been overloaded.

12. The combination with a vehicle chassis and a body, of fluid pressure means carried by the vehicle, springs interposed between the chassis and the body on opposite sides of the fluid pressure means, and a gage carried by the vehicle and connected to the fluid pressure means to indicate the total pounds carried by the vehicle and to indicate when the weight capacity of the vehicle has been reached.

13. The combination with a vehicle chassis and a body, of fluid pressure means carried by the vehicle, springs interposed between the chassis and the body on opposite sides of the fluid pressure means, a gage carried by the vehicle and connected to the fluid pressure means to indicate the total pounds carried by the vehicle and to indicate when the weight capacity of the vehicle has been reached, and means having operative connection with the indicating means and operable by said fluid pressure means to indicate the number of times the vehicle has been overloaded.

14. The combination with a vehicle chassis and a body, of upper and lower longitudinally disposed sills interposed between the body and the chassis on opposite sides thereof, fluid pressure containing elements interposed between the sills on opposite sides of the vehicle and which are compressible under the influence of weight placed on the body, yieldable elements interposed between the sills on opposite sides of the fluid pressure containing elements, a gage carried by the vehicle, and connections between the fluid pressure containing elements and the gage whereby the weight placed upon the body may be indicated.

15. In a vehicle including a chassis frame and a resiliently supported body, a fluid pressure means independent of the resilient body supporting means operable by the relative movement of the body and the chassis frame, yieldable elements co-acting with the fluid pressure means to yieldably support the body independently of the resilient body supporting means, and a gage operated by the fluid pressure means to indicate the amount of said relative movements between the body and said chassis frame.

16. In a vehicle including a chassis frame and a body, relatively long compressible fluid containing elements disposed between the chassis frame and the body along opposite sides thereof and arranged longitudinally of the same, yieldable elements disposed on opposite sides of the fluid containing elements, a gage on the vehicle, and connections between said compressible elements and the gage whereby the gage is operated under the influence of weight placed on said body.

17. In a vehicle, a chassis frame and a body, means interposed between the frame and body to yieldably support the body on the frame including a fluid containing element and yieldable elements arranged on opposite sides of the fluid containing element, a gage, and connections between the fluid containing element and the gage to operate the latter upon weight being placed on or removed from the body.

18. The combination of a vehicle body and a chassis frame, coöperating pairs of sills interposed between the chassis frame and the body, each pair of sills being arranged longitudinally of the chassis frame and body, yieldable means arranged between each pair of sills, including sets of springs and a fluid containing element between each set of springs, a gage carried by the vehicle, and connections between the fluid containing elements and the gage to operate the latter under influence of weight placed on or removed from said body.

19. The combination of a body, sills secured to the under side of the body, a sill supported under each of the aforesaid sills for coöperation with the first-named sills, yieldable means arranged between the coöperating sills and maintaining the coöperating sills normally spaced apart, said yieldable means adapted to contain a fluid, other yieldable elements arranged between the coöperating sills to coöperate with the aforesaid yieldable means to hold the sills normally spaced apart, a gage, and fluid containing and conveying connections between the yieldable fluid containing means and the gage to operate the latter upon compression of said yieldable means and yieldable elements incident to weight placed upon the body.

20. The combination of a vehicle including a chassis frame and a body including a driver's seat, means arranged between the chassis frame and the body and extending from the rear of the driver's seat to the rear of the body to cushion the latter, said means including a fluid containing element and yieldable elements on opposite sides of the fluid containing element, a gage on the vehicle, and fluid containing and conveying connections between the fluid containing element and the gage to operate the latter upon downward movement of the body against said yieldable means incident to weight placed on the body.

21. The combination with a chassis and a vehicle body, of a load indicator comprising fluid operated indicating means and fluid containing, compressible, operating, members interposed between the chassis and the body and connected to the indicating means, said members having walls formed of a thickness to support the body in spaced relation to the chassis in the absence of fluid in said members, and yieldable means interposed between the chassis and body to coact with said members.

22. The combination with a chassis and a vehicle body, of a load indicator comprising fluid operated indicating means and fluid containing, compressible, operating, members interposed between the chassis and the body and connected to the indicating means, said members having walls formed of a thickness to support the body in spaced relation to the chassis in the absence of fluid in said members, and sets of yieldable elements interposed between the chassis and body on opposite sides of said members.

23. The combination with a chassis and a vehicle body, of a load indicator comprising fluid operated indicating means and fluid containing, compressible, operating, members interposed between the chassis and the body and connected to the indicating means, said members having walls formed of a thickness to support the body in spaced relation to the chassis in the absence of fluid in said members, sets of yieldable elements interposed between the chassis and body on opposite sides of said members, and means for inclosing said members and yieldable elements.

24. The combination with an upper load carrying member and a lower member, of a fluid operating load indicating means, a fluid containing, operating, compressible, load supporting member interposed between said upper and lower members, said member having walls constructed to support the load independently of the presence of fluid therein, and springs between the chassis and body on opposite sides of said member.

25. The combination with a chassis and a vehicle body, of a load indicator comprising indicating means, and a compressible, supporting member interposed between the chassis and body and connected to the indicating means and constructed to contain an incompressible liquid, said member having walls formed of a thickness to support the body in spaced relation to the chassis independently of the presence of liquid in said member, and rows of springs interposed between the chassis and body on opposite sides of said member.

26. The combination with a chassis and a vehicle body, of a load indicator comprising a fluid operated load indicating means and a fluid containing, operating member interposed between the chassis and the body and connected to the load indicating means and operable to varying degrees of compression according to loads placed on the body to operate the indicating means, said member being capable of supporting the body under the same varying degrees of compression as aforesaid, incident to varying loads in the absence of fluid in said member, and yieldable means interposed between the chassis and body to coact with said fluid containing operating member.

27. The combination with a chassis and a vehicle body, of a load indicator comprising fluid operated indicating means and a fluid containing, compressible, operating member interposed between the chassis and the body, said member having walls constructed to support the body in operative position on the chassis in the absence of fluid in said member, yieldable elements interposed between the chassis and body adjacent said member, and means for inclosing said member and said yieldable elements.

28. The combination with a chassis and a vehicle body, of an indicating means including devices to indicate when the weight capacity of the vehicle has been reached, the total weight carried by the vehicle and the number of times the vehicle is overloaded, a fluid containing, compressible member interposed between the chassis and body to operate said indicating means, and yieldable elements interposed between the chassis and body on opposite sides of said member.

29. The combination with a chassis and vehicle body, of an indicating means including devices to indicate when the weight capacity of the vehicle has been reached, the total weight carried by the vehicle and the number of times the vehicle is overloaded, a fluid containing, compressible member interposed between the chassis and body to operate said indicating means, said member being constructed to support the body independently of the presence of fluid therein, and yieldable elements arranged between the chassis and body on opposite sides of said member.

30. In a load indicator, the combination of a chassis, a vehicle body, indicating means having as one element thereof a compressible, body-supporting member disposed between the chassis and the vehicle body, and sets of yieldable elements arranged between the chassis and the body on opposite sides of said member.

31. In a load indicator, the combination of a chassis, a vehicle body, an indicating means including a compressible body-supporting member disposed between the chassis and vehicle body, means controlled by said compressible member for actuating the indicating means, and yieldable elements arranged between the chassis and the body on opposite sides of said member.

32. In a load indicator, the combination of a chassis, a vehicle body, an indicating means having as one element thereof a fluid containing, compressible, body-supporting member disposed between the chassis and the vehicle body and constructed to adequately support the vehicle body independently of operative connection with the indicating means, and sets of yieldable elements interposed between the chassis and the body on opposite sides of said member.

33. In a load indicator, the combination of a chassis, a vehicle body, an indicating means having as one element thereof a fluid containing, compressible, body-supporting member disposed between the chassis and the vehicle body and constructed to adequately support the vehicle body independently of operative connection with the indicating means, means controlled by said member for actuating the indicating means, and yieldable elements interposed between the chassis and body adjacent said member.

34. The combination with a chassis and a vehicle body, of a load indicator comprising an indicating means, and means to operate the indicating means according to loads placed on the body, including a member formed of compressible material disposed between the chassis and the body and whose walls are constructed to support the body yieldably in normal operative position on the chassis independently of operative connection with the indicating means, and yieldable elements interposed between the chassis and the body adjacent said compressible member.

35. The combination of a chassis and a vehicle body, of a load indicator comprising an indicating means and means to operate the same according to loads placed on the body, including a member formed of compressible material disposed between the chassis and the body and constructed to support the body yieldably in normal operative position on the chassis independently of operative connection with the indicating means, and sets of springs interposed between the chassis and the body on opposite sides of said compressible member.

36. The combination of a chassis and a vehicle body, of a load indicator comprising an indicating means and means to operate the same according to loads placed on the body, including a member formed of compressible material disposed between the chassis and the body and constructed to support the body yieldably in normal operative position on the chassis independently of operative connection with the indicating means, sets of springs interposed between the chassis and the body on opposite sides of said compressible member, and means for inclosing said member and said springs.

In testimony whereof I affix my signature in the presence of two witnesses.

FREDERICK J. TROLL.

Witnesses:
JOHN H. SIGGERS,
GEO. C. SHOEMAKER.

Copies of this patent may be obtained for five cents each, by addressing the "Commissioner of Patents, Washington, D. C."